United States Patent [19]

Holcomb

[11] Patent Number: 4,653,115
[45] Date of Patent: Mar. 24, 1987

[54] TRANSMITTER BATTERY CASE

[76] Inventor: Jack N. Holcomb, P.O. Box 23130, Ft. Lauderdale, Fla. 33307

[21] Appl. No.: 716,635

[22] Filed: Mar. 27, 1985

[51] Int. Cl.⁴ .............................................. H04B 1/03
[52] U.S. Cl. ..................................... 455/128; 455/90; 455/89; 455/127; 455/348; 455/349
[58] Field of Search .................... 455/89, 90, 127, 128, 455/347, 348, 349, 351, 343; 361/422; 429/97

[56] References Cited

U.S. PATENT DOCUMENTS

| | | | |
|---|---|---|---|
| 3,305,779 | 2/1967 | Errichiello | 455/128 |
| 3,728,664 | 4/1973 | Hurst | 455/89 |
| 4,057,757 | 11/1977 | Darden, Jr. | 455/89 |
| 4,436,792 | 3/1984 | Tomino et al. | 429/97 |
| 4,578,628 | 3/1986 | Siwiak | 455/89 |

Primary Examiner—Jin F. Ng
Assistant Examiner—Elissa Seidenglanz
Attorney, Agent, or Firm—Herbert C. Schulze

[57] ABSTRACT

This invention is a case designed to contain a miniature battery of a particular design in connection with a radio transmitter wherein the case provides for quick access through a friction fitting cover and specially designed battery holding elements which permit removal and replacement of the special battery without the need of any tools or special training. The holding portion for the battery consists of two especially designed spring loaded case elements, one of which has a partial shelf to retain the battery.

3 Claims, 6 Drawing Figures

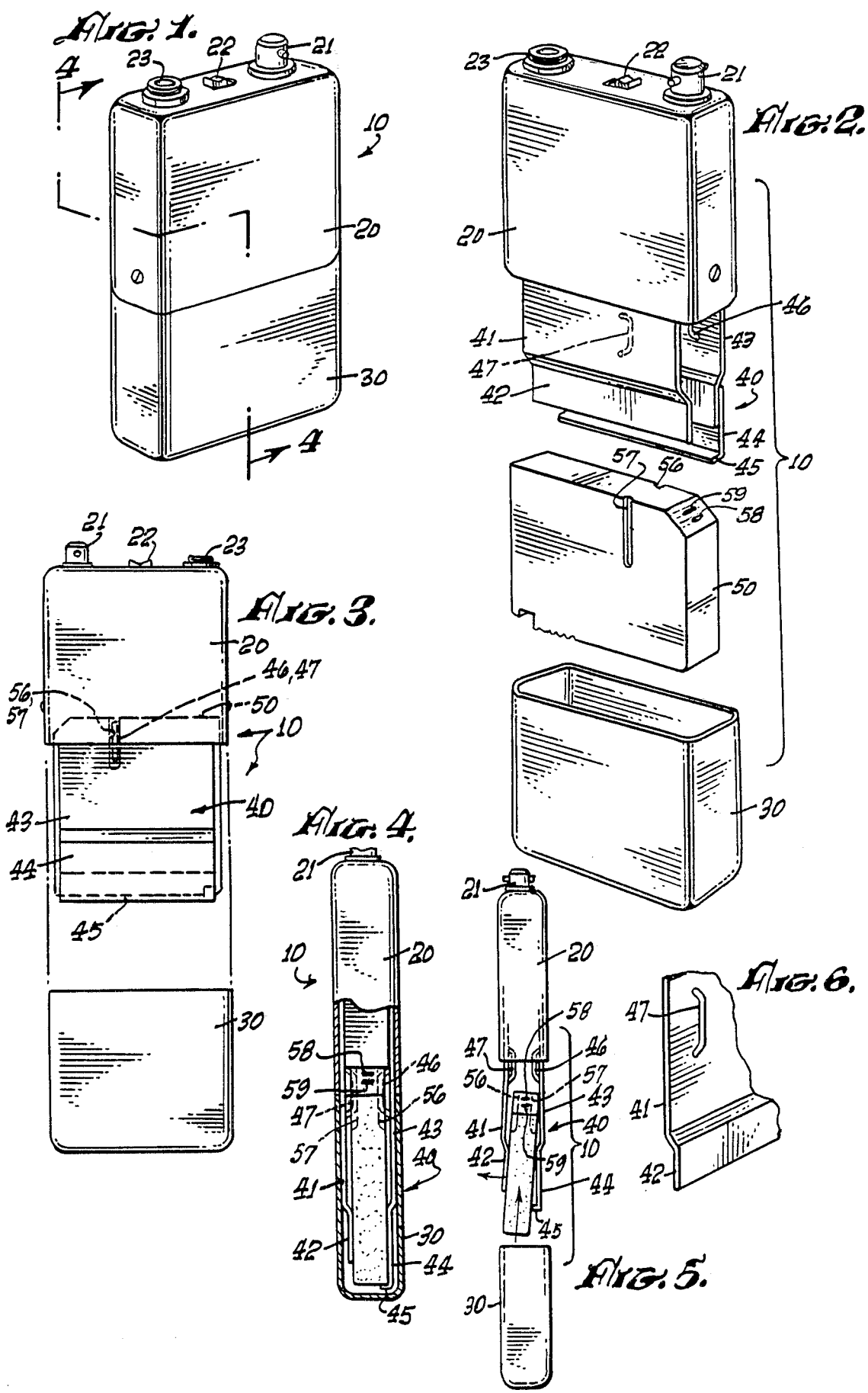

TRANSMITTER BATTERY CASE

CROSS REFERENCE TO RELATED PATENT APPLICATIONS

There are no patent applications pending filed by me related to this application with the exception of design application for the same battery and radio transmitter case being filed concurrently herewith and entitled "Case For Radio and Battery".

BACKGROUND OF THE INVENTION

I. Field of the Invention

This invention is in the general field of radio transmitters and power supplies for such transmitters. The invention is even more particularly related to a miniature radio transmitter and a miniature battery for its power supply. The invention is even more particularly directed to a unique case for containing the miniature transmitter and the miniature battery in a most effective manner and in which without special tools or training the battery power supply can be instantly removed or replaced.

II. Description of the Prior Art

There have been a number of small transmitters and other electronic devices using miniature special batteries. To list all would be futile since it would be an undue burden upon the patent office or anyone reading any patent which may result from this application to have such a lengthy description.

In general, however, it is true of all such prior art that a snapping arrangement, a locking arrangement, a lever arrangement, or some other such arrangement is always necessary properly to hold the battery for such devices in proper condition and placement for optimum operation. Such devices as have existed usually require some considerable reference to instructions and frequently a tool or the like for removing batteries from the case in which they may be contained.

The present invention is entirely unique, however, in that the entire unit and its functioning is based upon a friction gripping arrangement of an unusual nature wherein a portion of the case safely and efficiently presses itself against two battery holding elements which can only hold the battery in the proper configuration for proper functioning and with the combination no tool or other device is required to insert or remove the battery nor to keep it in safe and effective contact for continued operation as desired. In the sense, there is no prior art.

SUMMARY OF THE INVENTION

The use of miniature radio transmitters and radio receivers is wide spread. Particularly under technical circumstances such as police or other highly sophisticated surveillance type activities, and communication activities, it is necessary to have very small and inconspicuous transmitters with sufficient power for normal communication over reasonable distances.

A problem which has long plagued the industry is that it has always been necessary to provide special locking arrangements or special hook-up arrangements to provide sufficient battery power for effective and continued operation over periods of time normally required. The solution to this has been the use of levers, locks and even independent batteries connected at a distance from the transmitter. This is not satisfactory and places severe limits upon the handling of such devices in many instances.

I have studied this problem at length, and have finally conceived and developed a system for solving the problem wherein a specialized battery form is utilized in connection with specially formed battery holding devices which instantly assure proper contact for operation and at the same time provide for secure maintenance of the battery in position as well as effective maintenance means without the necessity of tools or other instruments or any special training or knowledge in order to accomplish the proper end.

In particular I use a battery known to those skilled in the art and designated as a Mallory #5K69 9 volt battery. Such a battery is generally schematically illustrated in the attached drawings. The battery need not necessarily be the Mallory and could be any other battery having similar characteristics.

In conjunction with the mounting of a miniature transmitter within a case, I use a case which has essentially two compartments within one of which the transmitter is mounted, and within which the other portion is provided to contain the battery. The portion to contain the battery is covered by a slip-on friction fitting covering apparatus which cooperates under tension with two battery holding elements. The two elements are so configured that the battery of the type shown and described can only be held in one way and no matter how unacquainted with the equipment one would be, it would be obvious that there was only one way for inserting the battery. The two battery holding elements then hold the battery in absolute and proper alignment and contact by means of the pressure applied through the friction fitting cover against the two battery holding elements, one of which has a lip providing for perfect holding of the device in place.

It is an object of this invention to provide a miniature radio transmitter or receiver or transceiver within a miniature case having an attached battery holding apparatus requiring no tools or special skills for insertion or removal of batteries.

Another object of this invention is to provide such a case as has been described, wherein the battery and its transmitting and/or receiving apparatus will appear to be a small intregal item.

The foregoing and other objects and advantages of this invention will become apparent to those skilled in the art upon reading the description of a preferred embodiment which follows, in conjunction with a review of the appended drawings.

BRIEF DESCRIPTION OF THE DRAWINGS

FIG. 1 is a perspective of the apparatus of this invention from the left front top;

FIG. 2 is an excluded view from the rear right top of FIG. 1;

FIG. 3 is a front elevation of the apparatus;

FIG. 4 is a side elevation partly sectioned and partly broken away;

FIG. 5 is an exploded view similar to FIG. 4 showing the insertion of the battery;

FIG. 6 is a fragmentary perspective of the battery guiding rib utilized.

DESCRIPTION OF A PREFERRED EMBODIMENT

FIGS. 1 through 5 should be viewed as a whole. The apparatus 10 of this invention is fully shown and explained best in this manner.

The case 10 consists of two basic parts, 20 and 30. Additionally there may be an antenna mount 21, a jack 22 and a jack 23. The two jacks may be used for microphones, earphones and the like.

The case portion 20 contains either a radio transmitter, receiver, or a transceiver. The details of the mechanism therein are not shown since a transmitter, receiver, or transceiver, are well known to those skilled in the art. The invention herein lies in the lower portion of the device wherein there is a battery holding apparatus generally 40 consisting of member 41, with its offset portion 42 as illustrated, and member 43 with its offset and adjoining portion 44 having a lip 45. These are for purposes of adequately holding the special battery heretofore mentioned, or a similar battery. It will be noted that there are ribs 46 and 47 which accommodate the grooves 56 and 57 on the battery 50.

The contacts for the battery 50 may be generally at 58 and 59 as indicated (or elsewhere as will be understood by those skilled in the art) and will contact appropriate contact devices (not shown) in the lower section of the case portion 20.

The contact of the batteries will take place at the general area 60 of the apparatus as particularly shown in FIG. 3 wherein the battery is in place.

The unusual design of the battery holding plates 41 and 43 with their offset and connecting portions will be apparent upon close examination of the drawings. The ribs 47 and 46 prevent the battery from being inserted in any manner other than the correct manner.

At the time of insertion of a battery, or removal thereof, the following procedure will take place: First, the lower case portion 30 will be removed from its friction contact with the portions 41 and 43 of the battery holding apparatus; At this time, a battery, if in place, may be removed by slipping it out as shown particularly in FIG. 5; The reverse procedure will take place upon inserting a new battery; Once the battery has been slipped into its holding container and resting upon the lip 45, the case portion 30 is slipped over the containing elements 41 and 43 and thus creates a strong friction hold upon the battery. With this friction hold the battery is secure. However, it is possible for the case 30 to be slipped off rapidly and efficiently by one using the device.

This apparatus may seem to be of a very simple nature. It is the very simplicity in which the invention lies. The use in this manner has achieved something not heretofore possible nor conceived of by those working in this art. It allows this very efficient cooperation of the particular type battery as indicated or one similar thereto with a miniature radio transmitter, receiver, transceiver or the like, without the need for special tools or procedures for the rapid changing of the battery.

While the embodiments of this invention shown and described are fully capable of achieving the objects and advantages of this invention, it is to be understood that the embodiments shown are for purposes of illustration only and not for purposes of limitation.

I claim:

1. Case means cooperable with radio circuitry means, which case means include provisions for automatic alignment of a battery means having alignment means including at least one groove associated with wherein said case means include tensionable battery gripping means and means to apply tension thereto including at least one detent cooperable with said groove so as to hold a battery inserted therein in a fixed and determinate position in only one configuration and wherein lip means are provided adjacent one edge of said battery tension means in such manner that the battery will be held by the said lip means with the detent referred to in cooperative contact with the groove referred to, and wherein an outer shell maintains the said battery in said position by means of pressure applied to the tension means when the said shell is covering the tension means.

2. The cooperative combination of a radio within a case and a battery to power said radio wherein a pair of elongated battery gripping members are attached to the case of the radio and depend away from said radio wherein one of said depending elements is provided with a lip to hold the bottom of said battery and wherein at least one of said battery holding means is provided with a detent cooperable with an indent in the said battery.

3. The apparatus of claim 2 wherein an outer shell is provided to cover completely the battery holding elements which shell is slidably moveable over said battery holding elements in such manner as to come into cooperative contact with the case of the radio and at that point to hold the battery in cooperative contact with said radio to provide for operation thereof.

* * * * *